US009022580B2

(12) United States Patent
Saitou et al.

(10) Patent No.: US 9,022,580 B2
(45) Date of Patent: May 5, 2015

(54) ILLUMINATION OPTICAL SYSTEM AND PROJECTOR USING THE SAME

(75) Inventors: Hiroyuki Saitou, Tokyo (JP); Atsushi Katou, Tokyo (JP); Motoyasu Utsunomiya, Tokyo (JP); Akihiro Osaka, Tokyo (JP); Masateru Matsubara, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 357 days.

(21) Appl. No.: 12/734,554

(22) PCT Filed: Jan. 29, 2010

(86) PCT No.: PCT/JP2010/051238
§ 371 (c)(1),
(2), (4) Date: May 7, 2010

(87) PCT Pub. No.: WO2011/092842
PCT Pub. Date: Aug. 4, 2011

(65) Prior Publication Data
US 2011/0249242 A1    Oct. 13, 2011

(51) Int. Cl.
*G03B 21/28* (2006.01)
*G03B 21/14* (2006.01)
(Continued)

(52) U.S. Cl.
CPC ............ *G03B 21/204* (2013.01); *H04N 9/3111* (2013.01); *H04N 9/3161* (2013.01); *G03B 21/208* (2013.01)
USPC .................. 353/98; 353/84; 353/33; 362/259; 362/553; 348/338; 348/339; 385/133; 359/634; 349/71

(58) Field of Classification Search
USPC ................ 353/98, 84, 33; 362/259, 553, 231; 348/338, 339; 385/133; 359/634; 349/71
See application file for complete search history.

(56) References Cited

U.S. PATENT DOCUMENTS

2003/0133080 A1    7/2003  Ogawa et al.
2005/0270775 A1*  12/2005  Harbers et al. ............... 362/231
(Continued)

FOREIGN PATENT DOCUMENTS

CN         1459661 A     12/2003
CN       201097088 Y      8/2008
(Continued)

OTHER PUBLICATIONS

Japanese Office Action dated Mar. 27, 2013 with a partial English translation thereof.
(Continued)

*Primary Examiner* — Toan Ton
*Assistant Examiner* — Magda Cruz
(74) *Attorney, Agent, or Firm* — McGinn IP Law Group, PLLC

(57) ABSTRACT

This invention realizes an illumination optical system with a small etendue that has a longer lifetime and a high degree of brightness. The invention includes: a laser light source that generates excitation light; a phosphor that generates a fluorescent light by means of the excitation light; a light tunnel that projects the excitation light that is incident at one end towards the phosphor from another end, and projects a fluorescent light generated with the phosphor from the one end; and a dichroic mirror that is provided between the laser light source and the light tunnel, and that allows the fluorescent light or the excitation light to pass through, and reflects the remaining excitation or fluorescent light.

20 Claims, 6 Drawing Sheets

(51) Int. Cl.
*H01S 3/00* (2006.01)
*G02B 6/00* (2006.01)
*G02B 27/14* (2006.01)
*G02F 1/1335* (2006.01)
*G03B 21/20* (2006.01)
*H04N 9/31* (2006.01)

(56) References Cited

U.S. PATENT DOCUMENTS

| | | | |
|---|---|---|---|
| 2006/0098451 A1* | 5/2006 | Hsu et al. | 362/555 |
| 2007/0019408 A1* | 1/2007 | McGuire et al. | 362/231 |
| 2009/0034284 A1 | 2/2009 | Li et al. | |
| 2009/0284148 A1 | 11/2009 | Iwanaga | |
| 2011/0044046 A1* | 2/2011 | Abu-Ageel | 362/259 |

FOREIGN PATENT DOCUMENTS

| | | |
|---|---|---|
| CN | 101581410 A | 11/2009 |
| JP | 2003-186110 | 7/2003 |
| JP | 2004-341105 1 | 12/2004 |
| JP | 2004-341105(A) | 12/2004 |
| JP | 2005-347263(A) | 12/2005 |
| JP | 2008-52070 | 3/2008 |
| JP | 2008-286823 | 11/2008 |
| JP | 2009-521786(A) | 6/2009 |
| TW | 200604466 | 2/2006 |

OTHER PUBLICATIONS

Chinese Examiner's comments on the Draft Response dated Jul. 9, 2014 with an English translation.

Chinese Office Action dated Aril 28, 2014 with an English Translation.

* cited by examiner (a)

(b)

(c)

(d)

ILLUMINATION OPTICAL SYSTEM AND PROJECTOR USING THE SAME

TECHNICAL FIELD

The present invention relates to an illumination optical system that generates illumination lights of a plurality of colors for forming image lights of a plurality of colors, and a projector that projects the image lights produced by the illumination optical system.

BACKGROUND ART

Technology that uses an LED (Light Emitting Diode) as a light source of a projector that projects an image onto a screen such as a liquid crystal projector or a DMD (Digital Micromirror Device) projector has been receiving attention (see Patent Literature 1).

Because an LED has a long lifetime and offers high reliability, projectors that employ an LED as a light source have the advantages of long lifetime and high reliability.

However, because the brightness of the light of an LED is low for use as a projector, it is not easy to obtain a projected image that has sufficient brightness with a projector employing an LED as a light source. The extent to which a display panel can utilize light from a light source as projection light is limited by the etendue. More specifically, unless the value of the product of a light-emission area of a light source and the angle of radiation is made less than or equal to a value of the product of the area of the plane of incidence of the display panel and the capturing angle that is determined by an f-number of the illumination optical system, the light from the light source can not be effectively utilized as projection light.

Although the light quantity of a light source that employs an LED can be increased by increasing the light-emission area, if the light-emission area increases, the etendue of the light source will also increase. As a light source for a projector, it is desirable in terms of the limitation produced by the etendue to increase the light quantity without increasing the light-emission area. However, it is difficult for a light source that employs an LED to increase the light quantity without increasing the light-emission area.

CITATION LIST

Patent Literature

Patent Literature 1: JP2003-186110A

SUMMARY OF INVENTION

Technical Problem

The etendue of a light source that using only an LED is increases. The present invention realizes an illumination optical system with a small etendue, a longer lifetime, and a high level of brightness.

Solution to Problem

An illumination optical system of the present invention comprises:
a laser light source that generates an excitation light;
a phosphor that generates fluorescent light by means of the excitation light;
a light tunnel that projects the excitation light that is incident at one end towards the phosphor from another end, and projects fluorescent light generated at the phosphor from the one end;
a dichroic mirror that is disposed between the laser light source and the light tunnel, and that allows the fluorescent light or the excitation light to pass through, and reflects the remaining excitation or fluorescent light. Further, a projector according to the present invention comprises the above described illumination optical system.

Advantageous Effects of Invention

According to the present invention, since a laser with a high energy density converges on a phosphor as excitation light, and since fluorescent light emitted from the place at which the laser converges is used, an illumination optical system can be realized that has a small etendue, a longer lifetime and a higher level of brightness.

DESCRIPTION OF EMBODIMENTS

Next, exemplary embodiments are described with reference to the drawings.

Figure 1:
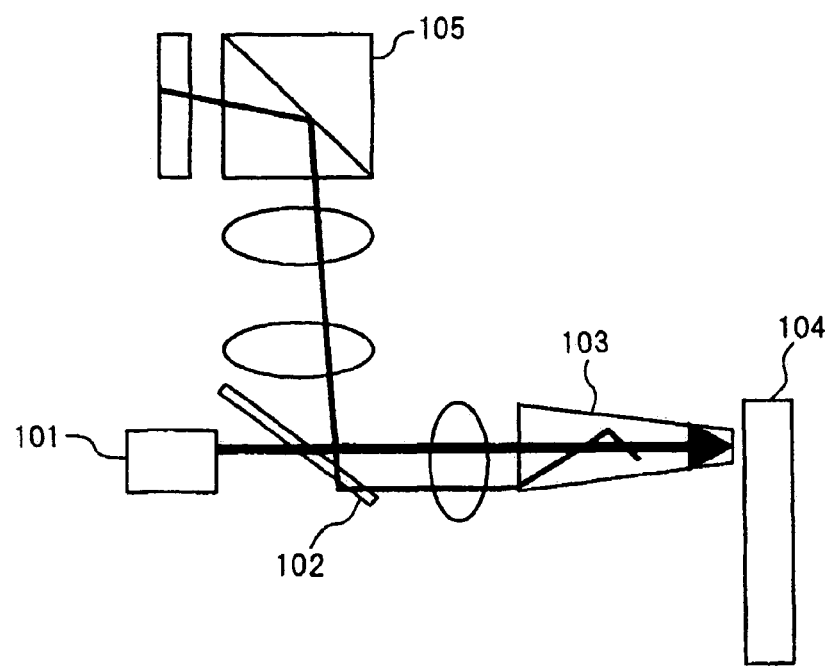
FIG. 1 is a block diagram that illustrates the configuration of a first embodiment of an illumination optical system according to the present invention.

FIG. 1 is a block diagram that illustrates the configuration of one exemplary embodiment of an illumination optical system according to the present invention.

The present exemplary embodiment includes laser light source 101, dichroic mirror 102, light tunnel 103, phosphor wheel 104, and reflecting prism 105.

Laser light source 101 generates laser light that provides excitation light having a wavelength λ1. The laser light generated by laser light source 101 is incident on phosphor wheel 104 through dichroic mirror 102 and light tunnel 103. Phosphor wheel 104 includes a plurality of fluorescent light generation regions that generate light of respectively different wavelengths by means of laser light generated by laser light source 101.

Figure 2:
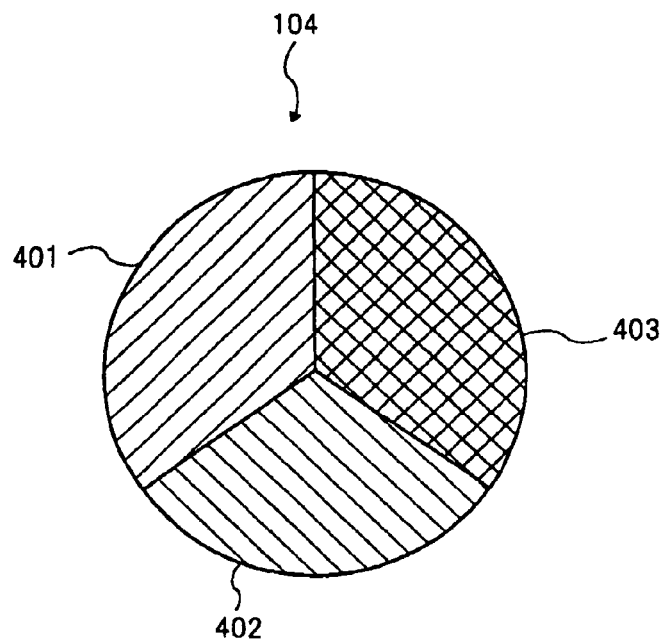
FIG. 2(a) is a plan view of phosphor wheel 104 as viewed from the plane of incidence of laser light generated by laser light source 101 (from the left side towards the right side in FIG. 1), and FIGS. 2(b), (c), and (d) are sectional views that illustrate the structure of blue fluorescent light region 401, green fluorescent light region 402, and red fluorescent light region 403.
Figure 2:
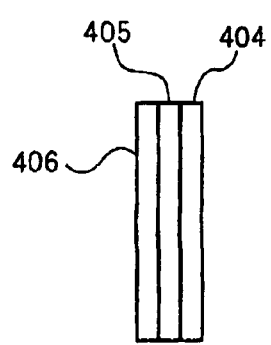
Figure 2:
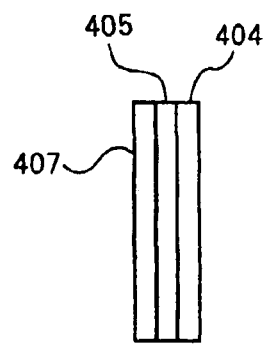
Figure 2:
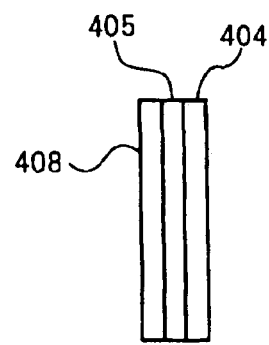

FIG. 2(a) is a plan view of phosphor wheel 104 as viewed from the plane of incidence of laser light generated by laser light source 101 (from the left side towards the right side in FIG. 1).

The circular phosphor wheel 104 includes blue fluorescent light region 401, green fluorescent light region 402, and red fluorescent light region 403. The respective regions are defined by the angle from the center. When laser light generated by laser light source 101 is incident on blue fluorescent light region 401, green fluorescent light region 402, or red fluorescent light region 403, blue fluorescent light, green fluorescent light, or red fluorescent light having wavelengths $\lambda 2, \lambda 3, \lambda 4$ ($\lambda 2<\lambda 3<\lambda 4$) that are longer than wavelength $\lambda 1$ are generated, respectively.

FIGS. 2(b), (c), and (d) are sectional views that illustrate the structure of blue fluorescent light region 401, green fluorescent light region 402, and red fluorescent light region 403.

In blue fluorescent light region 401 shown in FIG. 2(b), reflective layer 405 that reflects light having wavelengths $\lambda 2$ to $\lambda 4$ and blue phosphor layer 406 are formed in a layered manner on substrate 404. When excitation laser light having wavelength $\lambda 1$ is incident on blue phosphor layer 406, blue phosphor layer 406 generates blue fluorescent light of wavelength $\lambda 2$.

In green fluorescent light region 402 shown in FIG. 2(c), green phosphor layer 407 is formed on reflective layer 405. When excitation laser light having wavelength $\lambda 1$ is incident on green phosphor layer 407, green phosphor layer 407 generates green fluorescent light having wavelength $\lambda 3$.

In green fluorescent light region 403 shown in FIG. 2(d), red phosphor layer 408 is formed on reflective layer 405. When excitation laser light having wavelength $\lambda 1$ is incident on red phosphor layer 408, red phosphor layer 408 generates red fluorescent light having wavelength $\lambda 4$.

The phosphor wheel having the above described structure rotates around the center thereof, and the incidence position of laser light generated by laser light source 101 is in the vicinity of the outer circumferential portion thereof. Therefore, blue fluorescent light, green fluorescent light, and red fluorescent light are generated in sequence in a state in which laser light generated by laser light source 101 is incident thereon, and the generated light is reflected by reflective layer 405 and is incident again on light tunnel 103.

According to the present exemplary embodiment, lights having four wavelengths, $\lambda 1$ to $\lambda 4$, are used, and the relationship between the wavelengths is $\lambda 1<\lambda 2<\lambda 3<\lambda 4$. Dichroic mirror 102 reflects light of $\lambda 2, \lambda 3$, and $\lambda 4$, and allows light of $\lambda 1$ to pass therethrough. Light tunnel 103 is formed in a tapered shape in which the sizes of two end faces that serve as light incidence/projection surfaces are different. Because light tunnel 103 has a tapered shape, the angle distribution of fluorescent light generated at each phosphor and diffused can be changed and homogenized. In this case, the term "light tunnel" includes a light tunnel in which a hollow internal surface is formed with a mirror, and a light tunnel which comprises a solid, transparent polygonal column and utilizes total reflection. The latter is also referred to as a "rod lens".

According to the present exemplary embodiment, laser light generated by laser light source 101 passes through dichroic mirror 102 and is incident on phosphor wheel 104 through light tunnel 103. Blue fluorescent light, green fluorescent light, and red fluorescent light that are sequentially generated at phosphor wheel 104 are incident again on light tunnel 103. The lights are reflected at dichroic mirror 102 and reflecting prism 105 and are emitted as illumination light.

As described above, according to the illumination optical system of the present exemplary embodiment, uniformized red fluorescent light, green fluorescent light, and blue fluorescent light appear in sequence and are used as illumination light.

Figure 3:
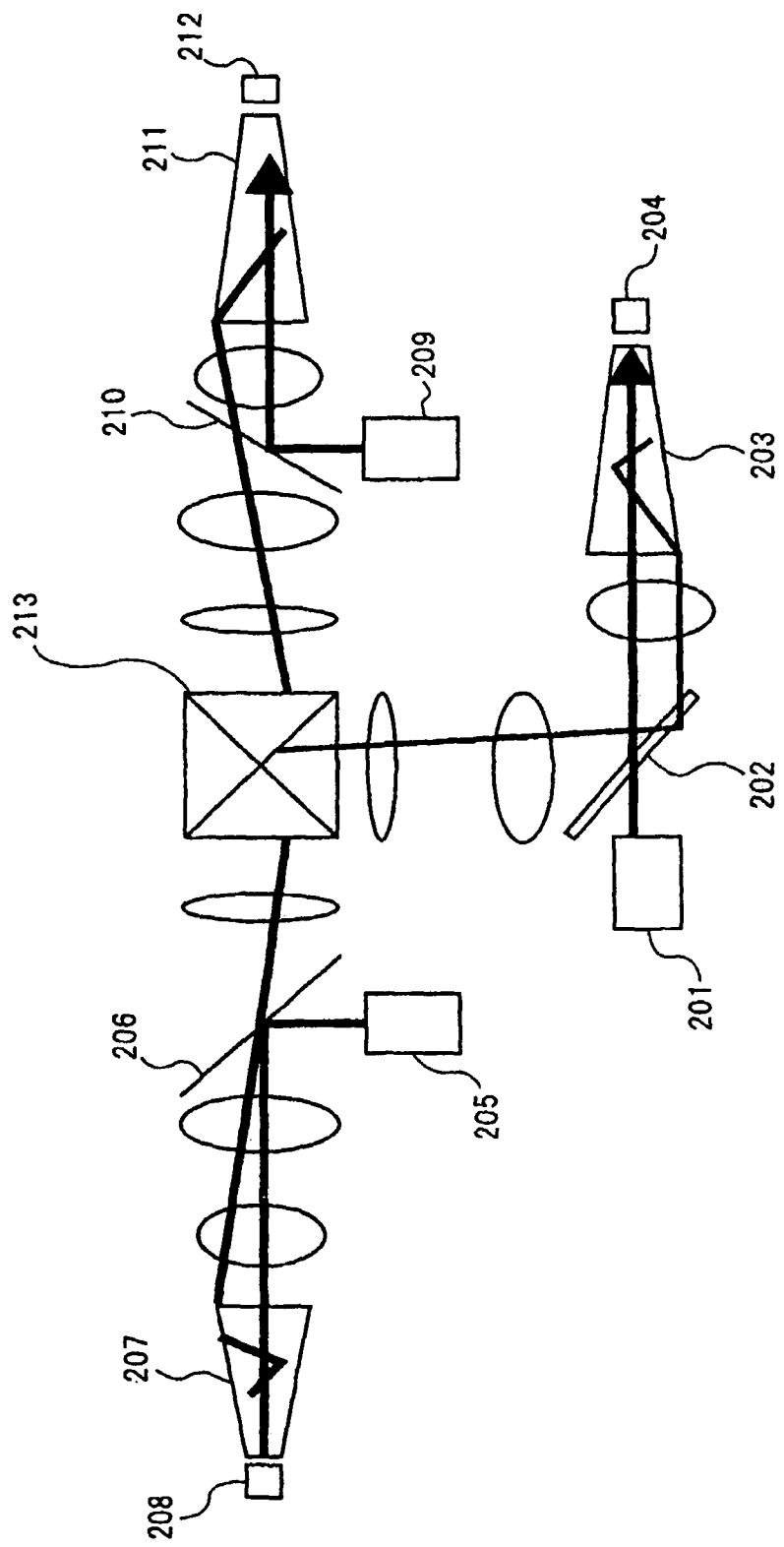
FIG. 3 is a block diagram illustrating the configuration of another exemplary embodiment of the illumination optical system according to the present invention.

FIG. 3 is a block diagram illustrating the configuration of another exemplary embodiment of the illumination optical system according to the present invention.

According to the exemplary embodiment illustrated in FIG. 1, fluorescent light of three colors is generated by a single excitation light source by using a phosphor wheel that includes three fluorescent light regions. In contrast, the present exemplary embodiment is provided with individual excitation light sources for the respective phosphors of each color.

The present exemplary embodiment comprises laser light sources 201, 205, 209, dichroic mirrors 202, 206, 210, light tunnels 203, 207, 211, blue phosphor 204, green phosphor 208, red phosphor 212, and cross dichroic prism 212.

Laser light sources 201, 205, and 209 generate laser light that is used as excitation light of wavelength $\lambda 1$. Blue phosphor 204, green phosphor 208, and red phosphor 212 generate blue fluorescent light, green fluorescent light, and red fluorescent light having wavelengths $\lambda 2, \lambda 3$, and $\lambda 4$ ($\lambda 2<\lambda 3<\lambda 4$) that are longer than wavelength $\lambda 1$, respectively, when laser light generated by laser light source 201 is incident thereon.

The structure of blue phosphor 204, green phosphor 208, and red phosphor 212 is the same as the structure of blue fluorescent light region 401, green fluorescent light region 402, and red fluorescent light region 403 shown in FIG. 2(b), (c), and (d), in which blue phosphor, green phosphor, and red phosphor are formed on a reflective layer formed on a substrate, respectively.

Dichroic mirror 202 allows light of wavelength $\lambda 1$ to pass therethrough and reflects light of $\lambda 2$. Dichroic mirror 206 reflects light of wavelength $\lambda 1$, and allows light of $\lambda 3$ to pass therethrough. Dichroic mirror 210 reflects light of wavelength $\lambda 1$, and allows light of $\lambda 4$ to pass therethrough.

Light tunnels 203, 207, and 211 are formed in a tapered shape in which sizes of the two ends are different, similarly to light tunnel 103 shown in FIG. 1, and thus the angle distribution of fluorescent light that is generated at each phosphor and that is diffused can be changed and homogenized. The term "light tunnel" includes a light tunnel in which a hollow internal surface is formed with a mirror, and a light tunnel which comprises a solid, transparent polygonal column and which utilizes total internal reflection.

Laser light generated by laser light source 201 is incident on blue phosphor 204 through dichroic mirror 202 and light tunnel 203. Blue fluorescent light that is generated at blue phosphor 204 passes through light tunnel 203, is reflected by dichroic mirror 202, and is incident on cross dichroic prism 213.

Laser light generated by laser light source 205 is reflected by dichroic mirror 206 and is incident on green phosphor 208 through light tunnel 207. Green fluorescent light generated at green phosphor 208 passes through light tunnel 207 and dichroic mirror 202 and is incident on cross dichroic prism 213.

Laser light generated by laser light source 209 is reflected by dichroic mirror 210 and is incident on red phosphor 221 through light tunnel 211. Red fluorescent light generated at red phosphor 212 is incident on cross dichroic prism 213 through light tunnel 211 and dichroic mirror 210.

Cross dichroic prism 213 allows light having wavelength $\lambda 2$ to pass and reflects light having wavelength $\lambda 3$ and $\lambda 4$. Consequently, the respective fluorescent lights that are generated at the respective phosphors are projected in the same direction.

According to the present exemplary embodiment arranged as described above, since units that generate fluorescent light are provided for each color, a plurality of fluorescent lights can be generated simultaneously. Further, by driving laser light sources 201, 205, and 209 in sequence, each fluorescent light can also be output sequentially, similarly to the illumination optical system illustrated in FIG. 1.

The present exemplary embodiment provides a unit that generates fluorescent light with respect to each color. Two kinds of units are provided: a unit for blue light in which laser light of laser light source 201 passes through dichroic mirror 202 and is incident on light tunnel 203, and units for green light and red light in which laser lights of laser light sources 205 and 209 are reflected by dichroic mirrors 206 and 210 and are incident on light tunnels 207 and 211. These may be mixed, or naturally only one of these may be used. Since the same fluorescent lights can be obtained with different optical systems, the design freedom can be improved.

Figure 4:
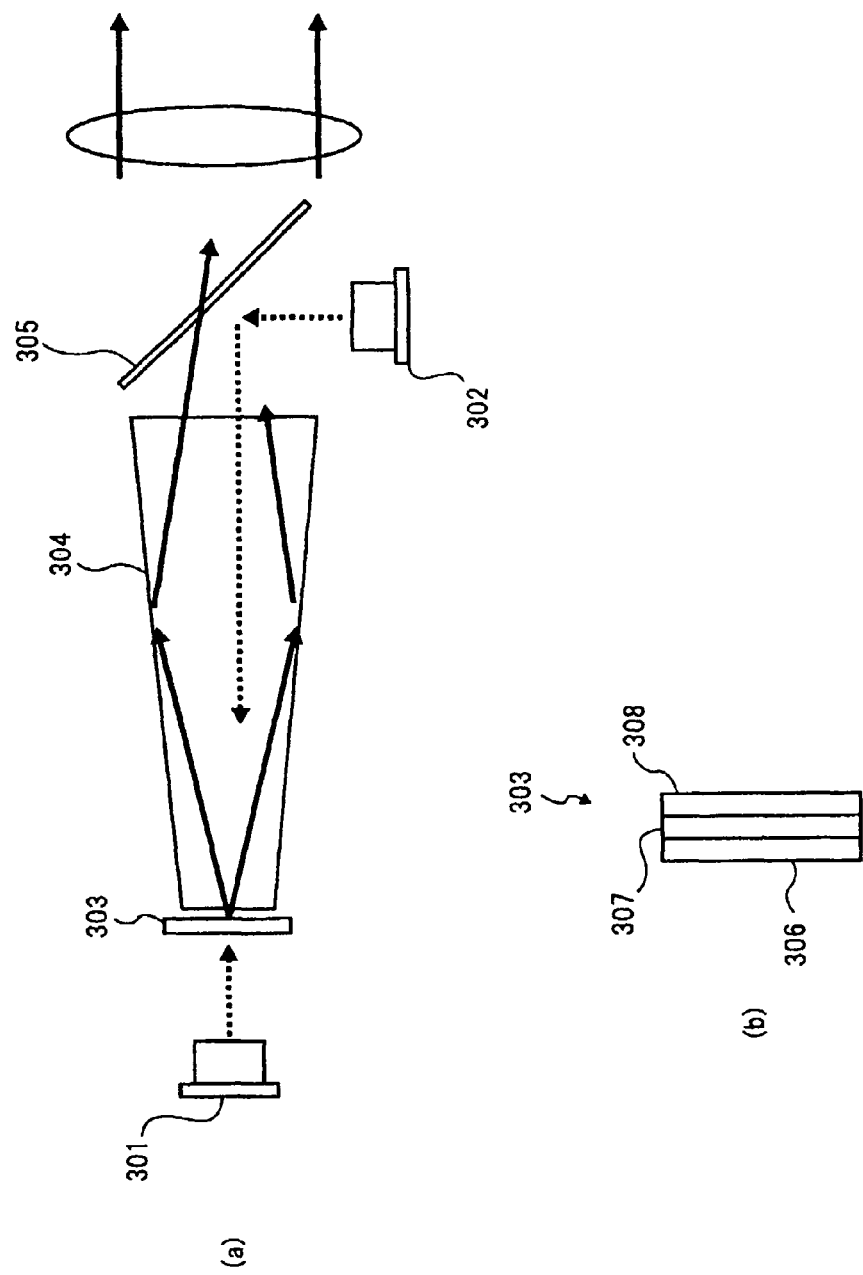
FIG. 4(a) is a block diagram illustrating the configuration of another exemplary embodiment of the illumination optical system according to the present invention.
FIG. 4(b) is a sectional view illustrating the structure of phosphor 303.

FIG. 4(*a*) is a block diagram that illustrates the arrangement of another exemplary embodiment of an illumination optical system according to the present invention.

Relative to the exemplary embodiment shown in FIG. 3, the present exemplary embodiment is a modification example of a unit in which, among units provided for each color, excitation light generated by a laser light source is reflected by a dichroic mirror and is incident on a light tunnel, and which increases the light output.

The present exemplary embodiment includes laser light sources 301 and 302, phosphor 303, light tunnel 304, and dichroic mirror 305. Laser light sources 301 and 302 generate laser light having the same wavelength as excitation light.

FIG. 4(*b*) is a sectional view that illustrates the structure of phosphor 303. As shown in the figure, reflective layer 307 and phosphor layer 308 are formed in a layered manner on substrate 306. By means of the laser light of laser light sources 301 and 302, phosphor layer 308 generates fluorescent light having a longer wavelength that that of the laser light in question. Reflective layer 307 allows laser light generated by laser light sources 301 and 302 to pass therethrough, and reflects fluorescent light generated by phosphor layer 308.

Dichroic mirror 305 reflects laser light generated by laser light sources 301 and 302, and allows fluorescent light generated by phosphor layer 308 to pass therethrough.

Laser light generated by laser light source 301 passes through reflective layer 307 and is incident on phosphor layer 308. Laser light generated by laser light source 302 is reflected by dichroic mirror 305 and is incident on phosphor layer 308. At phosphor layer 308, fluorescent light is generated by means of laser light from laser light sources 301 and 302 that is incident thereon. The fluorescent light generated at phosphor layer 308 is output to the outside through light tunnel 304 and dichroic mirror 305, and is utilized as illumination light. Although laser light that does not contribute to the generation of fluorescent light also exists among the laser light of laser light sources 301 and 302, since the laser light in question is reflected by dichroic mirror 305, the laser light is not projected to the outside.

Phosphor 303 of the present exemplary embodiment may also comprise an illumination optical system that outputs each color in sequence as the phosphor wheel illustrated in FIG. 1. Further, the unit of the present exemplary embodiment may also comprise the illumination optical system illustrated in FIG. 3 as three units that generate respectively different fluorescent lights.

Figure 5:
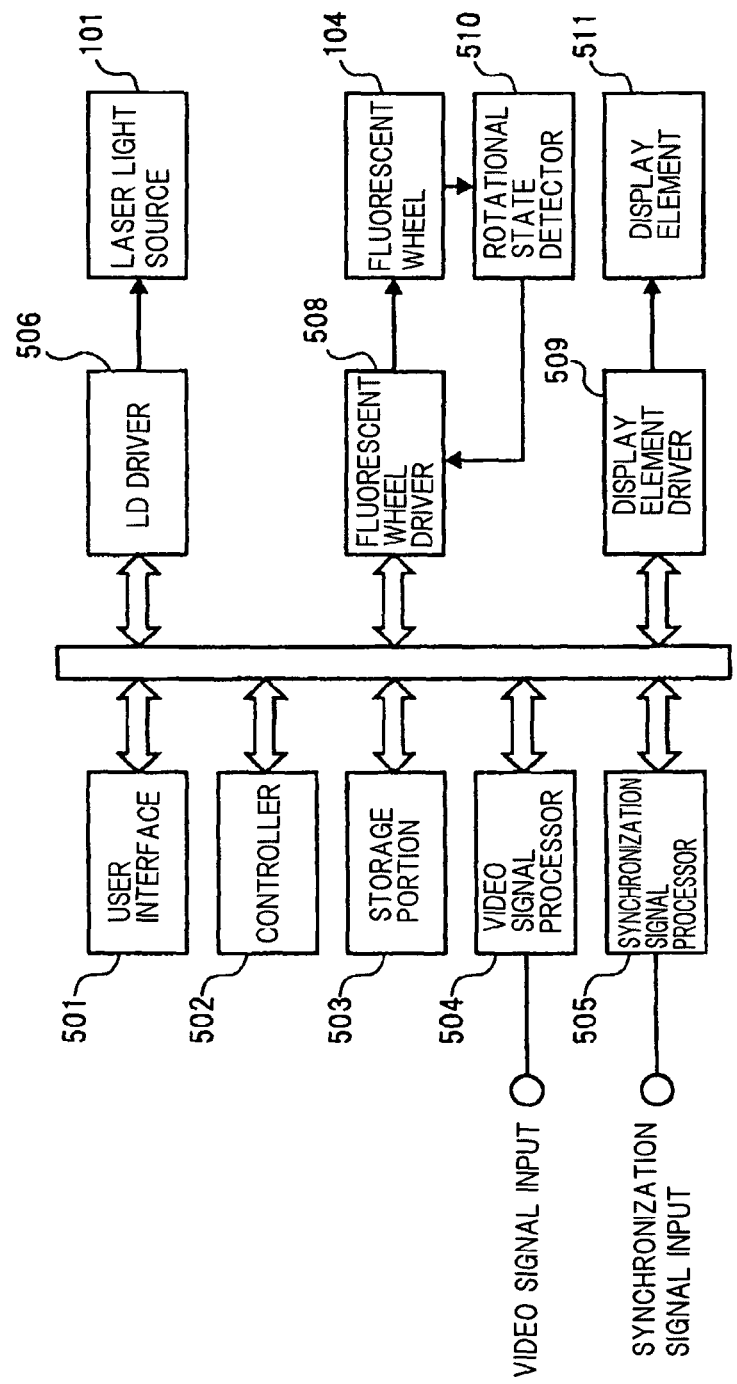
FIG. 5 is a block diagram illustrating the circuit configuration of a projector that uses the illumination optical system of the exemplary embodiment shown in FIG. 1.

FIG. 5 is a block diagram illustrating the circuit configuration of a projector that uses the illumination optical system of the exemplary embodiment shown in FIG. 1.

The projector shown in FIG. 5 includes user interface 501, controller 502, storage portion 503, video signal processor 504, synchronization signal processor 505, LD driver 506, phosphor wheel driver 508, display element driver 509, rotational state detector 510, and display element 511, as well as laser light source 101 and phosphor wheel 104 shown in FIG. 1.

User interface 501 accepts instructions input from a user, and outputs the instructions to controller 502. User interface 501 also displays the current operating state of the projector on a display apparatus (not shown) such as an indicator or a display panel.

Controller 502 controls each component comprising the projector in accordance with a program stored in storage portion 503.

Storage portion 503 stores a control program of controller 503, or temporarily stores video data.

Video signal processor 504 converts a video signal input from the outside into a video signal to be used inside the projector. Since video signals of the present exemplary embodiment are formed by illumination lights of respective colors being output sequentially by an illumination optical system as described above, video signals according to each color are generated sequentially.

Synchronization signal processor 505 converts synchronization signals that are synchronized with video signals input from the outside into video signals to be used inside the projector. More specifically, synchronization signal processor 505 generates and outputs synchronization signals that show the output timing of video signals of each color.

LD driver 506 controls a lighting state of laser light source 101 according to synchronization signals output from synchronization signal processor 505.

Rotational state detector 510 detects a rotational state of phosphor wheel 104, and outputs the detected result to phosphor wheel driver 508.

Phosphor wheel driver 508 controls the rotational state of phosphor wheel 104 so that a color of a video signal indicated by a synchronization signal output by synchronization signal processor 505 and a color output by the illumination optical system that indicates a rotational state of phosphor wheel 104 detected by rotational state detector 510 match.

Display device driver 509 drives display element 511 in accordance with video signals output by the video signal processor. In this case, a display element that sequentially displays images of each color such as a reflective image forming element in which a plurality of micromirrors are arranged in a matrix and which forms an image according to a reflection state of each micromirror, or a transmission-type liquid crystal display element or a reflective liquid crystal display element is used as the display element 511.

According to the projector configured as described above, display element 511 that displays images corresponding to each color by means of illumination light of each color sequentially output from the illumination optical system is illuminated, and reflection images or transmission images of display element 511 are sequentially projected through a projection optical system (unshown).

Figure 6:
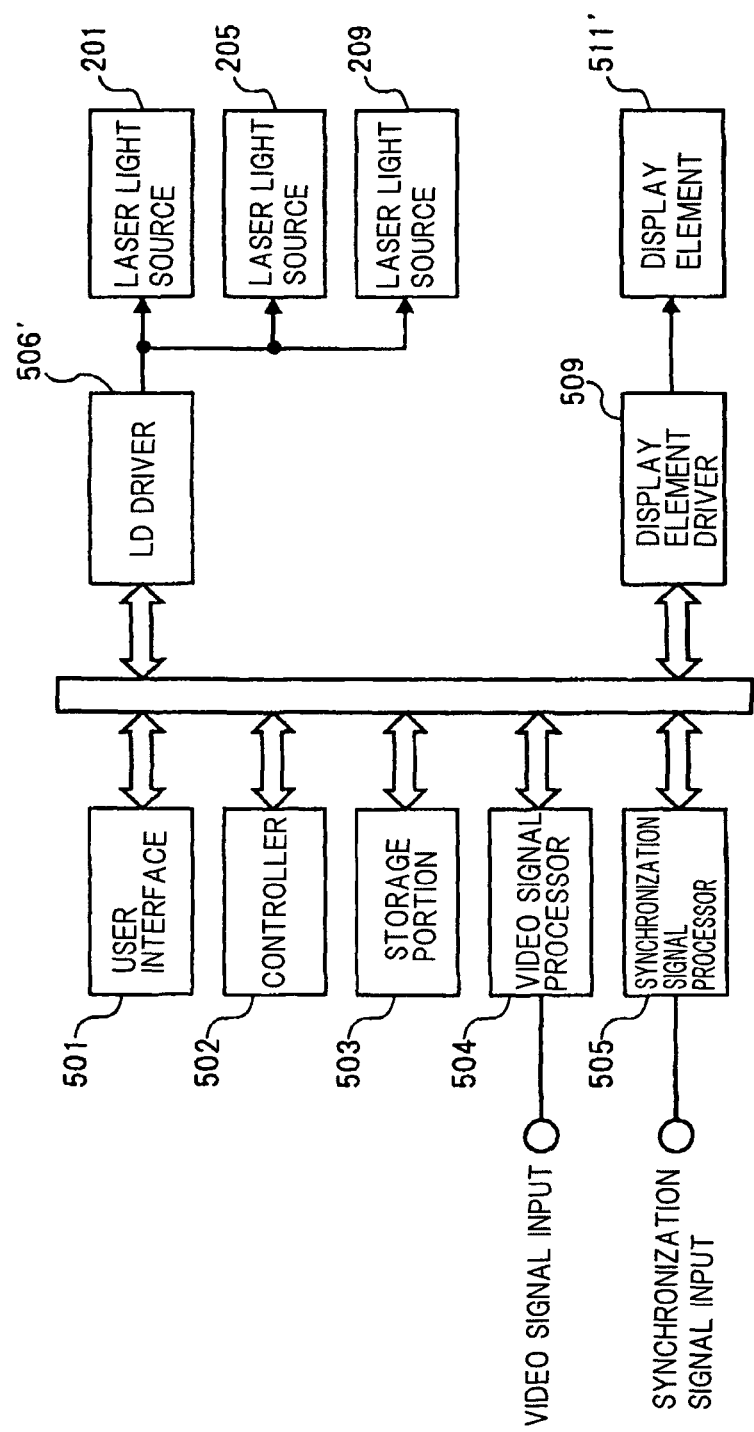
FIG. 6 is a block diagram illustrating the circuit configuration of a projector that uses the illumination optical system of the exemplary embodiment shown in FIG. 3.

FIG. 6 is a block diagram illustrating the circuit configuration of a projector that uses the illumination optical system of the exemplary embodiment shown in FIG. 3.

The projector shown in FIG. 6 includes user interface 501, controller 502, storage portion 503, video signal processor 504, synchronization signal processor 505, LD driver 506', display element driver 509', and display element 511, as well as laser light sources 201, 205, and 209 shown in FIG. 1.

Since the configuration and operation of user interface 501, controller 502, storage portion 503, video signal processor 504, and synchronization signal processor 505 are the same as in the exemplary embodiment illustrated in FIG. 5, these components are assigned the same reference numbers as in FIG. 5, and a description thereof is omitted below.

LD driver 506' controls a lighting state of laser light sources 201, 205, and 209 in accordance with synchronization signals output by synchronization signal processor 505.

Display element driver 509' drives display element 511' in accordance with video signals output by the video signal processor. In this case, similarly to the display element 511 shown in FIG. 5, a display element that sequentially displays images of each color such as a reflective image forming element in which a plurality of micromirrors are arranged in a matrix and which forms an image according to the reflection state of each micromirror, or a transmission-type liquid crystal display element or a reflective liquid crystal display element is used as the display element. Hence, LD driver 506' turns on laser light sources 201, 205, and 209 in accordance with image colors displayed by display element 511'.

In this connection, some transmission-type liquid crystal display elements and reflective liquid crystal display elements display color images. When a display element that performs a color display is used as display element 511', LD driver 506' turns on laser light sources 201, 205, and 209 at the same time.

According to the projector configured as described above, display element 511' that displays images corresponding to each color by means of illumination light of each color sequentially output from the illumination optical system is illuminated, and reflection images or transmission images of display element 511' are sequentially projected through a projection optical system (not shown).

DESCRIPTION OF SYMBOLS

101 Laser light source
102 Dichroic mirror
103 Light tunnel
104 Phosphor wheel
105 Reflecting prism

The invention claimed is:

1. An illumination optical system, comprising:
   a light source that generates an excitation light;
   a phosphor that generates a fluorescent light by the excitation light;
   a light tunnel that projects the excitation light that is incident at one end towards the phosphor from another end, and that projects a fluorescent light generated with the phosphor from the one end; and
   a dichroic mirror that is provided between the light source and the light tunnel, and that allows one of the fluorescent light and the excitation light to pass through the dichroic mirror, and reflects a remaining one of the excitation light and the fluorescent light,
   wherein the light tunnel changes an angle distribution of the fluorescent light, and homogenizes and projects the fluorescent light towards the dichroic mirror.

2. The illumination optical system according to claim 1, wherein the phosphor comprises a phosphor wheel that includes a plurality of fluorescent light regions that generate fluorescent lights having respectively different wavelengths, and on which a position irradiated by the light tunnel moves over each of the fluorescent light regions by a rotation thereof.

3. The illumination optical system according to claim 2, wherein the dichroic mirror reflects the excitation light,
   wherein the illumination optical system further includes a second light source that irradiates the excitation light towards the phosphor from a side opposite the light tunnel of the phosphor, and
   wherein the phosphor includes a reflective layer that is provided on a side of the second light source and allows the excitation light to pass therethrough and reflects the fluorescent light, and a phosphor layer provided on the light tunnel side.

4. A projector comprising an illumination optical system according to claim 3.

5. A projector comprising an illumination optical system according to claim 2.

6. An illumination optical system, comprising:
   a plurality of units of the illumination optical system according to claim 1,
   wherein a phosphor of each unit generates a fluorescent light of a respectively different wavelength, and
   wherein the illumination optical system includes a cross dichroic prism onto which outgoing light of each unit is incident and is projected in a same direction., 7. The illumination optical system according to claim 6, wherein the dichroic mirror reflects the excitation light,
   wherein the illumination optical system further includes a second light source that irradiates the excitation light towards the phosphor from a side opposite the light tunnel of the phosphor, and
   wherein the phosphor includes a reflective layer that is provided on the second light source side and allows the excitation light to pass therethrough and reflects the fluorescent light, and a phosphor layer provided on the light tunnel side.

8. A projector comprising an illumination optical system according to claim 7.

9. A projector comprising an illumination optical system according to claim 6.

10. The illumination optical system according to claim 1, wherein the dichroic mirror reflects the excitation light,
    wherein the illumination optical system further includes a second light source that irradiates the excitation light towards the phosphor from a side opposite the light tunnel of the phosphor, and
    wherein the phosphor includes a reflective layer that is provided on a side of the second light source and allows the excitation light to pass therethrough and reflects the fluorescent light, and a phosphor layer provided on the light tunnel side.

11. A projector comprising an illumination optical system according to claim 10.

12. A projector comprising an illumination optical system according to claim 1.

13. The illumination optical system according to claim 1, wherein the phosphor moves with respect to the light tunnel.

14. The illumination optical system according to claim 1, wherein, when the excitation light passes through the dichroic mirror, the fluorescent light is reflected by the dichroic mirror, and
    wherein, when the excitation light is reflected by the dichroic mirror, the fluorescent light passes through the dichroic mirror.

15. The illumination optical system according to claim 1, wherein the phosphor comprises a phosphor wheel that includes a plurality of fluorescent light regions that generate fluorescent lights having respectively different wavelengths.

16. The illumination optical system according to claim 1, wherein the phosphor comprises a phosphor wheel that includes a plurality of fluorescent light regions, and on which a position irradiated by the light tunnel moves over each of the fluorescent light regions by a rotation thereof.

17. The illumination optical system according to claim 1, wherein the illumination optical system further includes a second light source that irradiates the excitation light towards the phosphor from a side opposite the light tunnel of the phosphor.

18. The illumination optical system according to claim 17, wherein the phosphor includes a reflective layer that is provided on a side of the second light source and allows the excitation light to pass therethrough and reflects the fluorescent light, and a phosphor layer provided on the light tunnel side.

19. The illumination optical system according to claim 1, wherein the phosphor faces the light source such that said one end of the light tunnel faces the light source and said another end of the light tunnel faces the phosphor.

20. A method of producing illumination light, said method comprising:
- generating an excitation light in a light source;
- generating, by a phosphor, a fluorescent light from the excitation light;
- projecting, by a light tunnel, the excitation light that is incident at one end of the light tunnel towards the phosphor from another end of the light tunnel, and projecting a fluorescent light generated with the phosphor from the one end of the light tunnel; and
- allowing, in a dichroic mirror that is provided between the light source and the light tunnel, one of the fluorescent light and the excitation light to pass through the dichroic mirror, and to reflect a remaining one of the excitation light and the fluorescent light,
- wherein the light tunnel changes an angle distribution of the fluorescent light, and homogenizes and projects the fluorescent light towards the dichroic mirror.

* * * * *